US009246405B2

(12) United States Patent
Bank (10) Patent No.: US 9,246,405 B2
(45) Date of Patent: Jan. 26, 2016

(54) ELECTRICAL ENERGY TRANSMISSION SYSTEM WITH A SINGLE TRANSMISSION LINE

(71) Applicant: Michael Bank, Jerusalem (IL)

(72) Inventor: Michael Bank, Jerusalem (IL)

(73) Assignee: SLE INTERNATIONAL, LLC, Bay Harbor Island, FL (US)

( * ) Notice: Subject to any disclaimer, the term of this patent is extended or adjusted under 35 U.S.C. 154(b) by 0 days.

(21) Appl. No.: 14/555,951

(22) Filed: Nov. 28, 2014

(65) Prior Publication Data

US 2015/0229232 A1 Aug. 13, 2015

Related U.S. Application Data

(63) Continuation-in-part of application No. 14/172,517, filed on Feb. 4, 2014, which is a continuation-in-part of application No. PCT/IL2012/000291, filed on Aug. 2, 2012.

(51) Int. Cl.
*H02J 3/00* (2006.01)
*H02M 7/44* (2006.01)
*H02J 3/44* (2006.01)
*H02J 4/00* (2006.01)
*H02J 3/02* (2006.01)

(52) U.S. Cl.
CPC .. *H02M 7/44* (2013.01); *H02J 3/02* (2013.01); *H02J 3/44* (2013.01); *H02J 4/00* (2013.01)

(58) Field of Classification Search
CPC .......................................................... H02J 3/00
USPC ................................................. 307/149, 151
See application file for complete search history.

(56) References Cited

U.S. PATENT DOCUMENTS

| | | | | |
|---|---|---|---|---|
| 593,138 A * | 11/1897 | Tesla | ..................... | G05B 11/016 307/149 |
| 5,701,239 A * | 12/1997 | Bjorklund | ................. | H02J 3/36 363/35 |
| 6,104,107 A * | 8/2000 | Avramenko | ............ | H02J 5/005 307/149 |
| 7,139,180 B1 * | 11/2006 | Herbert | ................... | H02M 1/42 363/124 |
| 7,633,782 B1 * | 12/2009 | Herbert | ..................... | G05F 1/70 323/207 |
| 8,300,438 B1 * | 10/2012 | Herbert | ............... | H02M 1/4216 363/124 |
| 2010/0206554 A1 * | 8/2010 | Neuhaus | ................... | E21B 4/04 166/244.1 |
| 2012/0038167 A1 * | 2/2012 | Kjaer | ...................... | H02M 1/12 290/55 |

* cited by examiner

*Primary Examiner* — Adi Amrany
(74) *Attorney, Agent, or Firm* — Henry M. Feiereisen LLC.

(57) ABSTRACT

An electrical energy transmission system has a three-phase electric current power source which generates a three-phase electric current having three electric currents, a converting device which converts the three-phase electric current to obtain a common electric current signal formed by summation of three electric currents having the same phases, and a single-line electrical transmission line which transmits further the thusly produced common electric current signal.

12 Claims, 10 Drawing Sheets

ELECTRICAL ENERGY TRANSMISSION SYSTEM WITH A SINGLE TRANSMISSION LINE

CROSS-REFERENCE TO RELATED APPLICATIONS

This application is a Continuation-in-Part of U.S. patent application Ser. No. 14/172,517 filed Aug. 2, 2012, which is a Continuation-in-Part of International Application No. PCT/IL2012/000291 filed Aug. 2, 2012, designating the United States and claiming priority to U.S. Provisional Application No. 61/514,906 filed Aug. 4, 2011, the disclosures of all foregoing applications being incorporated herein by reference in their entireties.

FIELD OF THE INVENTION

The present invention relates to the field of electrical systems. More particularly, the invention relates to electrical energy transmission systems which are used to transmit electrical energy generated by three-phase electric power sources over certain distances, including significantly long distances.

BACKGROUND OF THE INVENTION

An electrical energy transmission system for transmitting a generated three-phase current conventionally includes a three-phase electrical power generator and an electrical transmission line which transmits the generated electrical energy to a load.

There were attempts to carry out the electrical energy transmission by means of one wire. First applications of the single-wire electrical energy transmission were disclosed by Nikola Tesla in U.S. Pat. No. 593,138 and in British Patent No. 8,200. Another single line transmission technique is known as the Goubau line or G-line, which is a type of single wire transmission line used at UHF and microwave frequencies (see Geog Goubau, "Surface waves and their Application to Transmission Lines," Journal of Applied Physics, Volume 21, November, 1950). However, a G-line is a type of waveguide, rather than a wire for an electric circuit. There was also an experiment based on U.S. Pat. No. 6,104,107 to Avramenko et al. All these concepts were based on signal processing, including frequency converting or signal straightening. They however negatively influence the process of transmission of electrical energy and lead to loss of power.

Also an electrical energy distribution method is known with the use of one conductor, however with a return of the electrical current through earth, according to the authors of the proposed method. This method is known as the Single Wire Earth Return (SWER). However, the simplification of the electrical energy transfer in this system is achieved due to the loss of a part of the power produced by the source. One of the reasons for the loss of power is the reactive power caused by the imbalance of the line, and this loss depends on the length of the line.

There are three-phase electrical energy transmission systems which have significant advantages associated with high efficiency of generators and motors. Conventional three-phase electrical energy transmission systems transmit electrical energy through three or four wires. However, the presence of three or four wires and also of large masts in not the only drawback of these systems. Another drawback is a line voltage between two wires in this system at the root of the three phase voltage. This may have negative consequences, such a corona effect and additional losses in the lines. Additional disadvantage of the three phase system is the need to arrange the wires at a distance of several meters from each other. This in turn makes difficult to use underground lines.

SUMMARY OF THE INVENTION

Accordingly, it is an object of the present invention to provide an electrical energy transmission system, which transmits electrical energy generated by a three-phase electrical power source and is a further improvement of the existing electrical energy transmission systems of this type.

In keeping with these objects and with others which will become apparent hereinafter, one feature of the present invention resides, briefly stated, in an electrical energy transmission system, comprising a three-phase electric current power source generating a three-phase electric current signal including three currents having different phases, a three-phase electric current signal converting device connected with said three-phase electric current source and converting the three-phase electric current signal generated by the latter, and a single-wire electrical energy transmission line connected with said converting device and transmitting further at least a part of the converted three-phase electric current signal.

When the electrical energy transmission system is designed according to the it allows a transmission of at least a part of the three-phase electric current signal through the single-wire transmission line, which results in significant economy of wires, especially in the systems which carry out transmission of electrical energy generated by three-phase electrical power sources over significant distances.

In accordance with one embodiment of the present invention, the converting device is constructed to shift the phases of at least some of the three electric currents so that the three currents have substantially identical phases in the converted common electrical current signal, which is then transmitted through the single-wire transmission line.

In accordance with a further embodiment of the present invention, a further converting device is provided on the opposite end of the single-wire transmission line and converts the common electric current signal received through the single-wire transmission line by shifting back the phases of at least some of the electric currents into the three-phase electric current signal to be supplied further.

It is also possible in accordance with a still further embodiment of the present invention that the converted common electric current signal transmitted through the single-wire transmission line is not converted back into a three-phase current, but instead is supplied through subsequent single-wire transmission lines to consumers.

In accordance with a further embodiment of the present invention, a step-up transformer can be provided before the first-mentioned converting device and a step-down transformer can be provided after the further converting device for correspondingly increasing and reducing a voltage of the electric current signals in order to reduce losses in wires of the system and connected with the converting devices.

In accordance with still a further embodiment of the present invention, the step-up transformer can be connected by a feed-back line with the first-mentioned converting device and/or the step-down transformer can be connected by a feed-back line with the second converting device, so that the conversions performed by the converting devices, such as for example shifting of the phases of the electric currents, are carried out with the same desired results, regarding of fluctuations of the electrical resistance of the load which otherwise would affect the shifting of the phases. In particular, the transformers react to changes in the resistance of the load by generating a control signal for changing their coefficient of transformation to provide a constant output voltage. The control signals for changing the coefficient of transformation are used to change a reactive electrical resistance to maintain constant a ratio of the reactive electrical resistance to the electrical resistance of the load, in order to provide in the converting devices the constant required shifting of phases.

In accordance with an additional embodiment of the present invention, the opposite end of the single-wire transmission line is provided with a further converting device that further transmit three currents of the received common electric current signal through single-wire transmission lines separately to subsequent loads.

In accordance with a further embodiment of the present invention, the currents of the generated three-phase electric signals can be supplied separately through individual sing-wire transmission lines to individual consumers.

In accordance with still a further embodiment of the present invention, an electric vehicle can use the transmitted electrical energy so that its electric motor can be connected to the further converting device to receive from the latter the three-phase electric signal through a further single-wire transmission line.

Finally, in accordance with a further embodiment of the invention, the single-wire transmission line can be subdivided into a plurality of line portions, and a plurality of further converting devices covert phases of the currents in the line portions by substantially 180 degrees to provide opposite phases in the neighboring line portions, in order to achieve a sum of energy in the neighboring line portions equal to zero.

The novel feature of the present invention are set forth in particular in the appended claims.

The invention itself, both as to its construction and its manner of operation, will be best understood from the following description of preferred embodiments, which is accompanied by the following drawings.

DETAILED DESCRIPTION OF THE INVENTION

Figure 1:
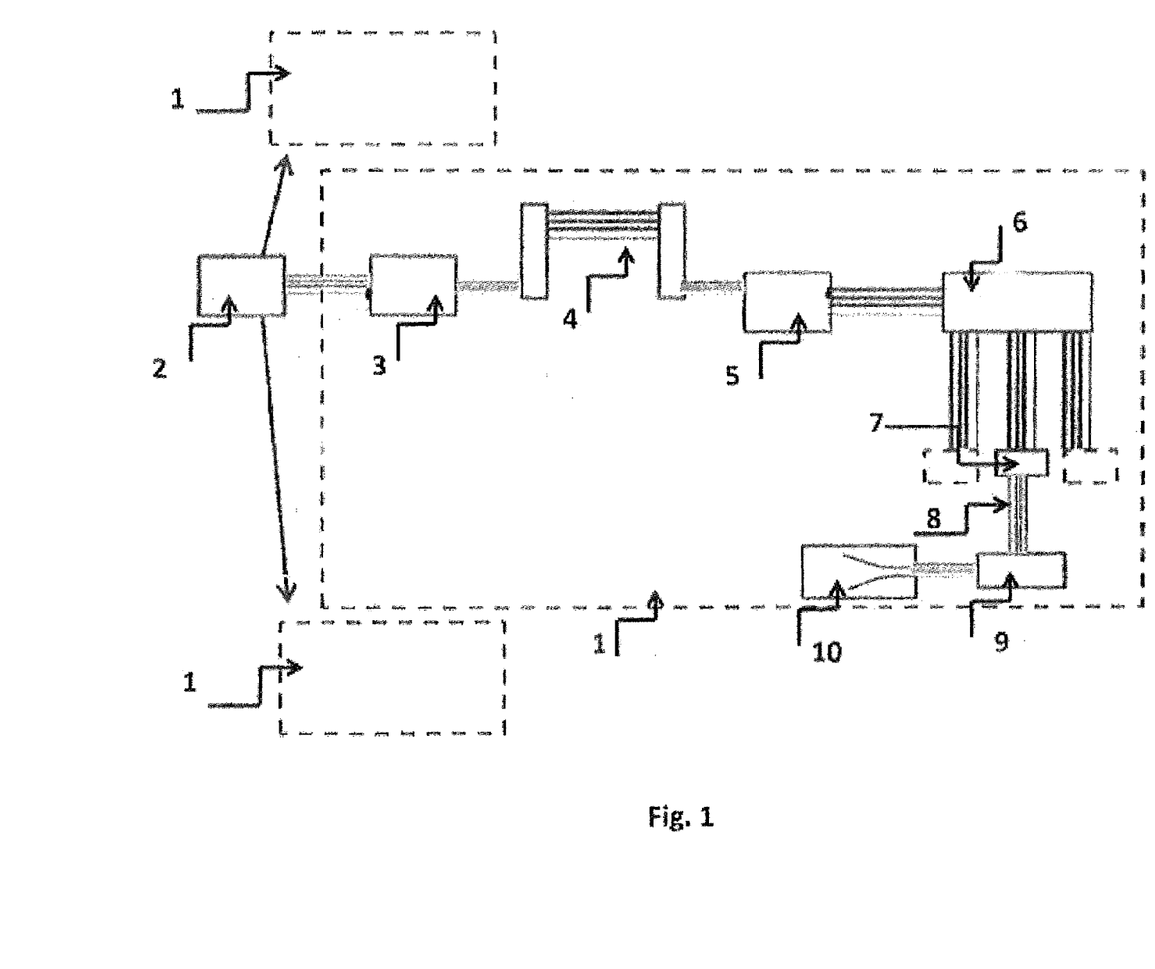
FIG. 1 is a view schematically showing a conventional system for transmission and distribution of electrical energy generated by a three-phase electric current power source.

FIG. 1 shows a conventional system for transmission of electrical energy, in particular for transmission of three-phase electric current, for example to some, for example three large areas 1. The system includes an electric current power source 2 which generates a three-phase electric current signal supplied to a step-up transformer 3 that increases the voltage of the signal. After the step-up transformer the three-phase electric current signal is transmitted via at least a three- or four-wire air, underground or underwater lines 4 over a required distance. Then the voltage of the transmitted three-phase electric current signal is reduced by a step-down transformer 5 and supplied further for example to a switchgear 6, and then through cable lines 7, a distribution point 8 and a step-down transformer supply center 9 to a residential building 10 or other consumers. As can be seen from FIG. 1, the three-phase electric current signal which includes three currents with phases that are offset from each other by 120 degrees is transmitted over the required distance and also between all components of the conventional system via at least three-wire lines.

Figure 2:
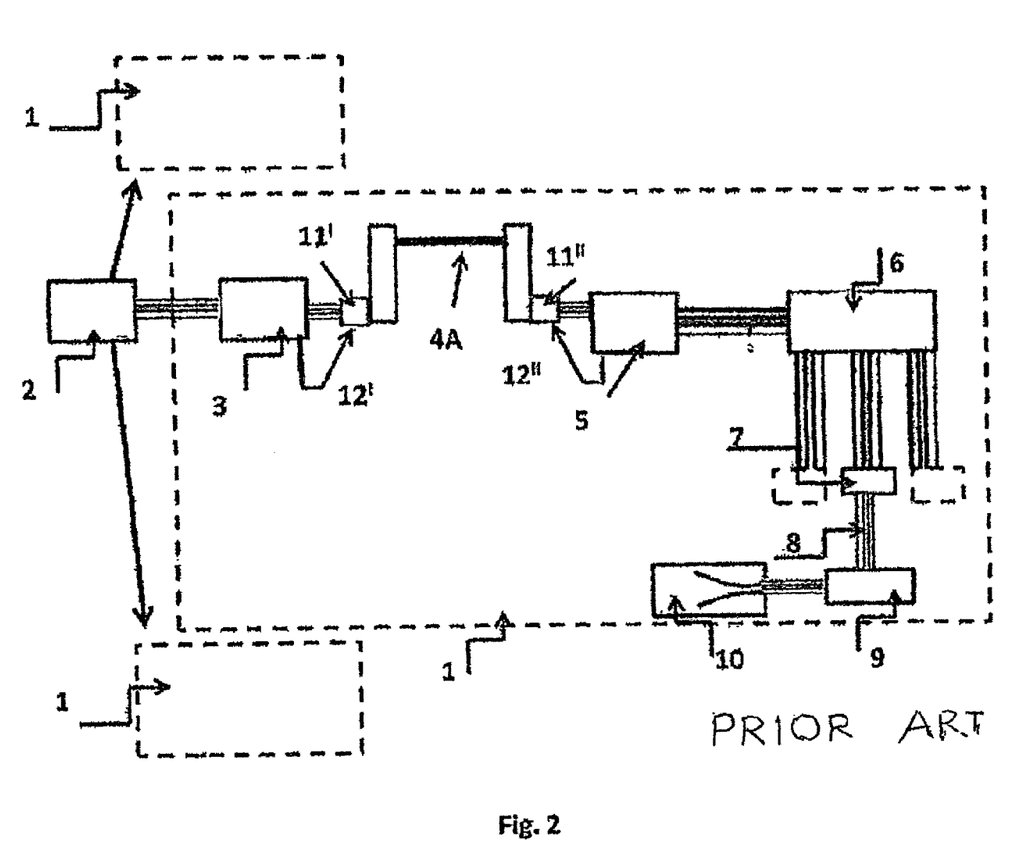
FIG. 2 is a view schematically showing a system for transmission and distribution of electrical energy generated by a three-phase electric current power source according to a first embodiment of the present invention.

FIG. 2 shows a system for transmission of electrical energy, for example to the three large areas 1, which is constructed in accordance with the present invention. It includes the electric current power source 2 which generates a three-phase electric current signal supplied to the step-up transformer 3 that increases the voltage of the signal. After the step-up transformer the electric current signal, which includes three electric currents, is transmitted to a converting device 11'. In the converting device 11' electric currents of the electric current signal are converted so that their phases are changed and become identical so that all three currents are united into one current to form a common electric current signal. The thusly formed common electric current signal is then transmitted via a single-wire line 4A through a required distance.

After the transmission, in a further converting device 11" the received electric current signal is converted so that the received electric current signal is divided into three electric currents and their phases are changed so that the phase difference between these three electric current constitutes 120 degrees. The step-down transformer 5 reduces the voltage of the thusly obtained three-phase electric current signal, which is then can be supplied to the switchgear 6 and further through the cable lines 7, the distribution point 8 and the step-down transformer supply center 9 to a residential building 10 or other consumers.

The significant difference between the new electrical energy transmission system according to the present invention shown in FIG. 2 and the conventional electrical energy transmission system shown in FIG. 1 is that in the electrical energy transmission system according to the present invention the electrical energy or the electrical current signal is transmitted over a required distance between the electrical energy producer and the electrical energy consumer via the single-wire transmission line 4A.

The term "single wire" transmission line is used to identify such a transmission line which is composed of one wire or of several wires which are twisted with one another and form together effectively as single electrical conductor.

The electric energy transmission system according to the invention shown in FIG. 2 can be provided with feed-back lines 12' and 12" associated with the converting devices 11' and 11" correspondingly. This is desirable since an electrical resistance of loads or consumers is not constant and subject to fluctuations and it can affect the conversion process in the converting device. It is known conventionally that an electrical energy transmission system must supply a constant voltage of an alternating current, since otherwise damages to equipment can occur. When electrical parameters of the load, for example its resistance, changes, then in known transformers the actually produced voltage can change correspondingly. These fluctuations of the electrical parameters of the load can also cause changes in shifting of the phases of the electrical current and the phases would not be shifted as required in the electrical energy transmission system according to the present invention. The transformers in the system according to the present invention, in response to fluctuations of an electrical resistance of a load generate a control signal to change their coefficient of transformation in order to maintain constant their output voltage. These control signals to change the coefficient of transformation of the transformers are used to maintain constant a ratio of a reactive resistance to an electrical resistance of the load and to provide in the converting devices the required constant shift of the phases regardless of the fluctuations of the load resistance.

The control signals are supplied through the feed-back lines 12' and 12" to the converting devices 11' and 11". As a result, regardless of the fluctuations in the electrical resistance of the load, the converting devices 11' and 11" provide the same consistent results for changing the electric currents in the electric current signals to have identical phases by the converting device 11' and for changing the electric currents in the electrical current signal to have different phases spaced from each other by 120 degrees by the converting device 11", correspondingly.

Figure 3:
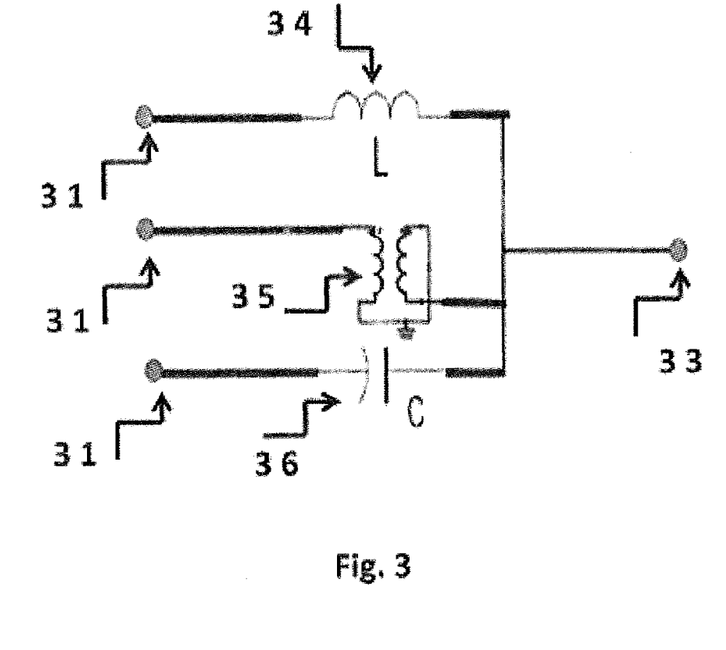
FIG. 3 is a view schematically showing a vector diagram of a converting device which converts corresponding three-phase signal in the electrical energy transmission system according to the present invention.

FIG. 3 shows an example of realization of the converting device 11'. It includes three lines 31 for supplying three electric currents of a three-phase electric current signal, an inductance 34, an invertor 35, and a capacitor 36, and it is connected to the single-wire line 33, via which the converted electric current signal is transmitted over a required distance. The connection of the inductance and the resistance of the load shifts the phase by minus 60 degrees, the connection of the capacitance with the resistance of the load changes the phase by plus 90 degrees, and the invertor change the phase by 180 degrees.

The converting device 11" can be composed of the same components as the converting device 11', but it operates in an opposite way, by converting the incoming common electric current signal with the electric currents having the same phases into the electric current signal in which the phases of the electric currents are spaced from each other by 120 degrees.

Figure 4:
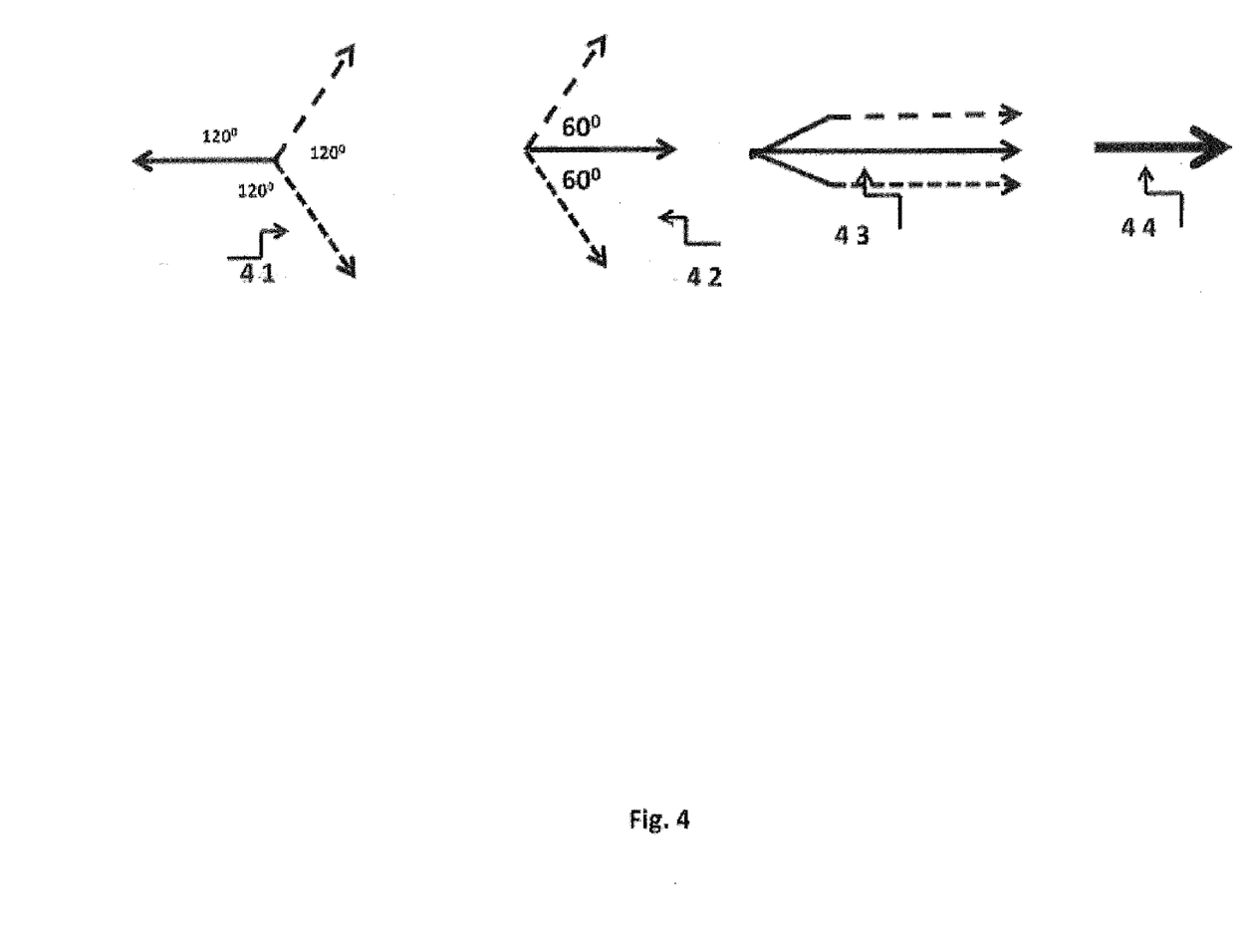
FIG. 4 is a view illustrating a vector diagram illustrating signal conversions by the converting devices of the electrical energy transmission system according to the present invention.

FIG. 4 shows a vector diagram of a conversion process which takes place in the converting device 11'. Initially in a three-phase electric current signal generated by the electric current power source 2 the electric currents in step 41 have phases which are offset from each other by 120 degrees. The converting device 11' in step 42 shifts the phase of a horizontally illustrated current by 180 degrees and shifts two other currents in step 43 by 60 degrees each to produce a common electric current signal with all currents have the same phases, which in step 44 is supplied into the single-wire transmission line.

Figure 5:
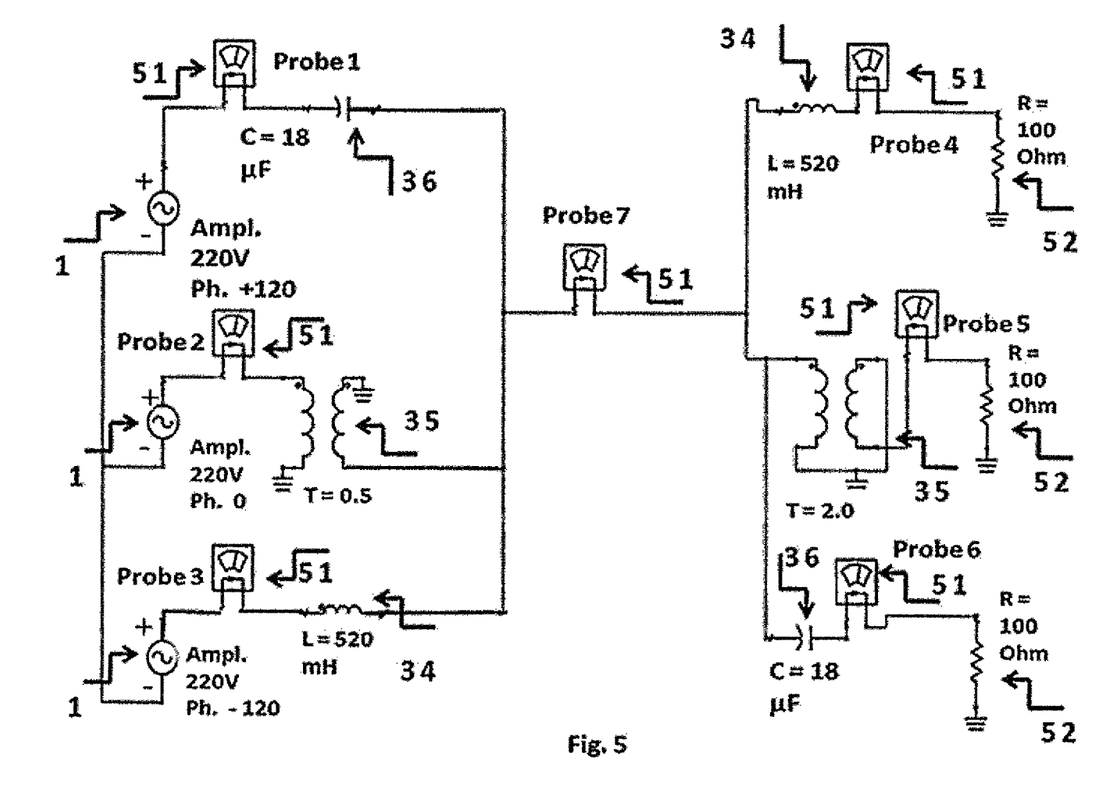
FIG. 5 is a view showing a simulation of conversion processes in the scheme of FIG. 4, which are carried out in the converting devices of the inventive system.

FIG. 5 shows a scheme of simulation of the conversion which illustrates how the converting device 11' carries out the conversion process. In the left there are three generators of sine-shaped currents with phases spaced from one another by 120 degrees. Probes or amperemeters 51 show amplitudes and shapes, or in other words phases of all three currents. Shifting of phases takes place in blocks 34,35,36. In block 36 which is a capacitor C a shift of 60 degrees takes place, in block 35 which is an inventor the shift of 180 degrees takes place, in block 34 which is an inductivity L a shift of 60 degrees takes place. In the probe 51 in the center a single sine signal is produced since all currents which are added to each other must have the same phases. In the right part a shift of phases takes place in blocks 34, 35, 36. In block 36 which is a capacitor a shift of 60 degrees takes place, in block 35 which is an invertor a shift of 120 degrees takes place, in block 35 which is an inductance a shift of 60 degrees takes place. A three phase signal is produced. Loads for all currents 52 (resistance R) are the same and equal to 100 Om. Knowing R, values of L and C are received from formulas:

$$X = arctg\, X/R',$$

where $$X = 2\pi FL$$

or $$X = 1/(2\pi FC),$$

where F is signal frequency, for example 50 or 60 Hz.

Figure 6:
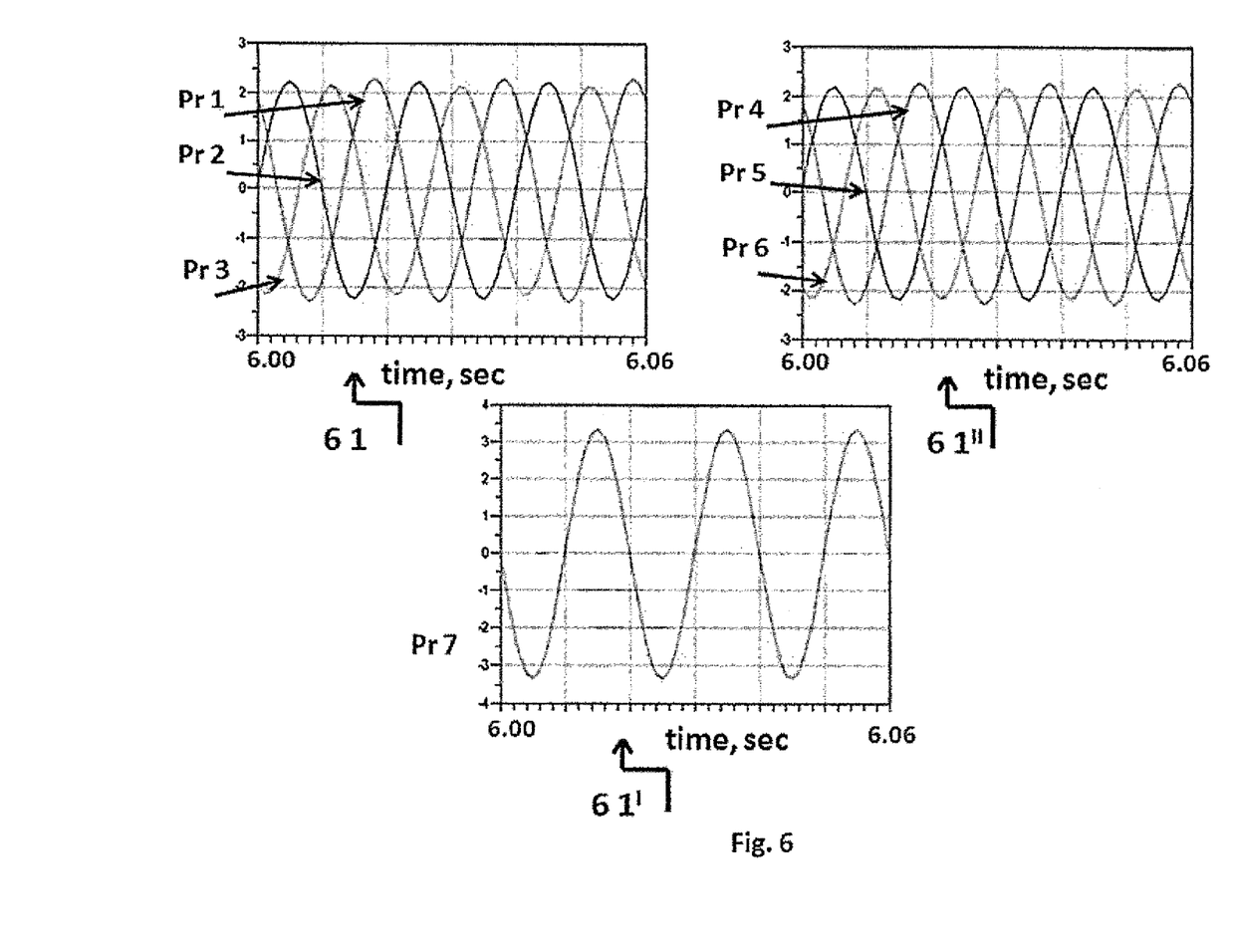
FIG. 6 is a view showing a simulation of corresponding currents which are transmitted through the system for transmission of electrical energy according to the present invention.

FIG. 6 shows a simulation of electric currents which are transmitted through the system according to the present invention. Graph 61 shows currents in ampermeters (probes) in the left part of the diagram of FIG. 5. It illustrates that there are three sinusoidal currents with a phase difference of 120 degrees or in other words a three-phase signal. FIG. 61' shows a single common signal which are produced and ready for transmission through the single-wire line. FIG. 61" shows a further three-phase signal which is then produced again. The simulation of FIG. 6 shows that the scheme of FIG. 5 allows to convert a conventional three-phase signal to a common electrical including three currents with the same phases, and then to covert it back into the three-phase signal.

Figure 7:
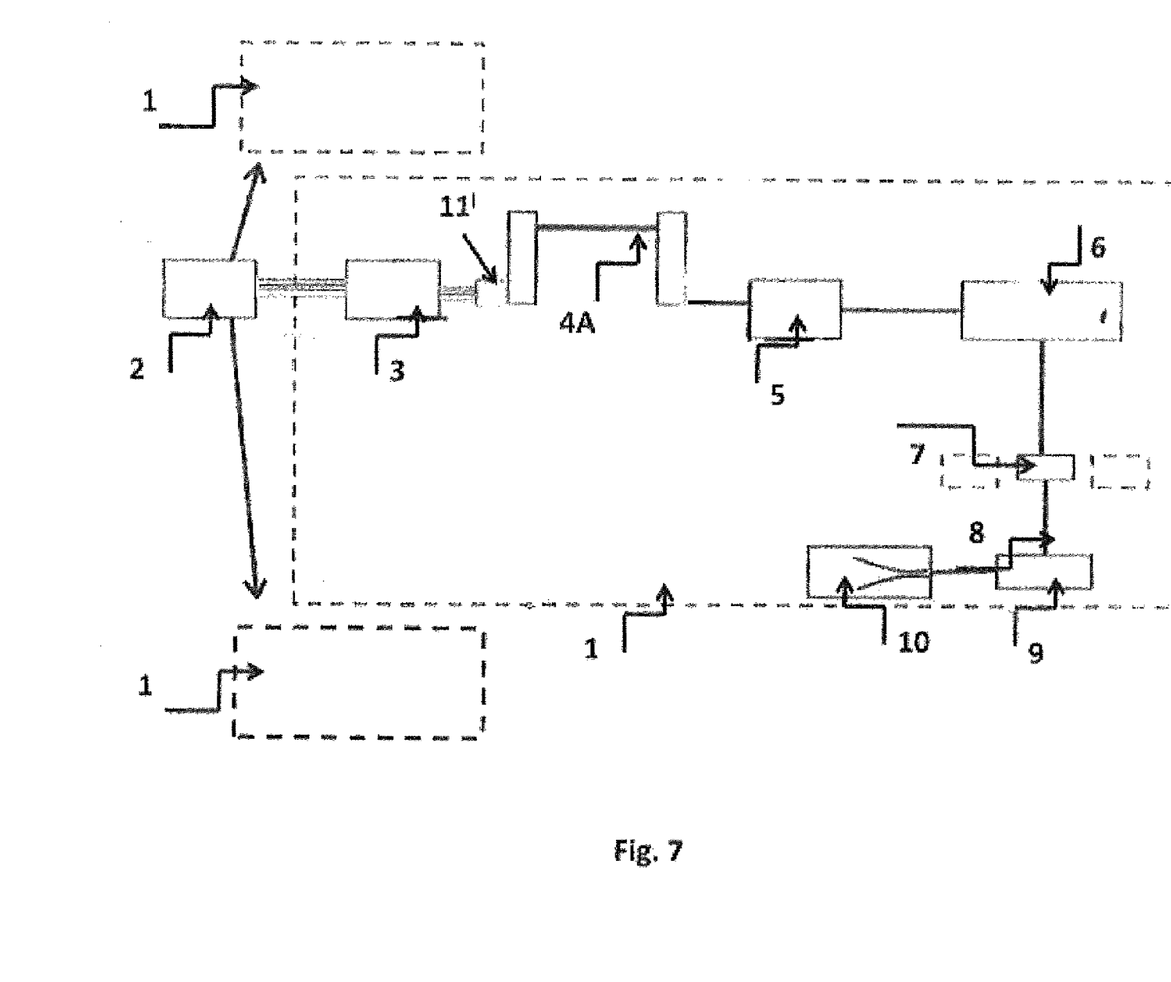
FIG. 7 is a view schematically showing a system for transmission and distribution of electrical energy generated by a three-phase electric current power source according to a further embodiment of the present invention.

FIG. 7 shows the electrical energy transmission system according to another embodiment of the present invention. In the system shown in FIG. 7 the components 2, 3, 11', 4A, and 5-10 correspond to the components of the system shown in FIG. 2 which are identified with the same references. However, in the electrical energy transmission system of FIG. 7 the electric current signal which has been transmitted via the single-wire transmission line 4A is not converted back into a three-phase electric signal with the electric currents having their phases offset from each other by 120 degrees. Instead the transmitted electric current signal with three currents having identical phases is supplied further to the subsequent components of the electrical energy transmission system.

Figure 8:
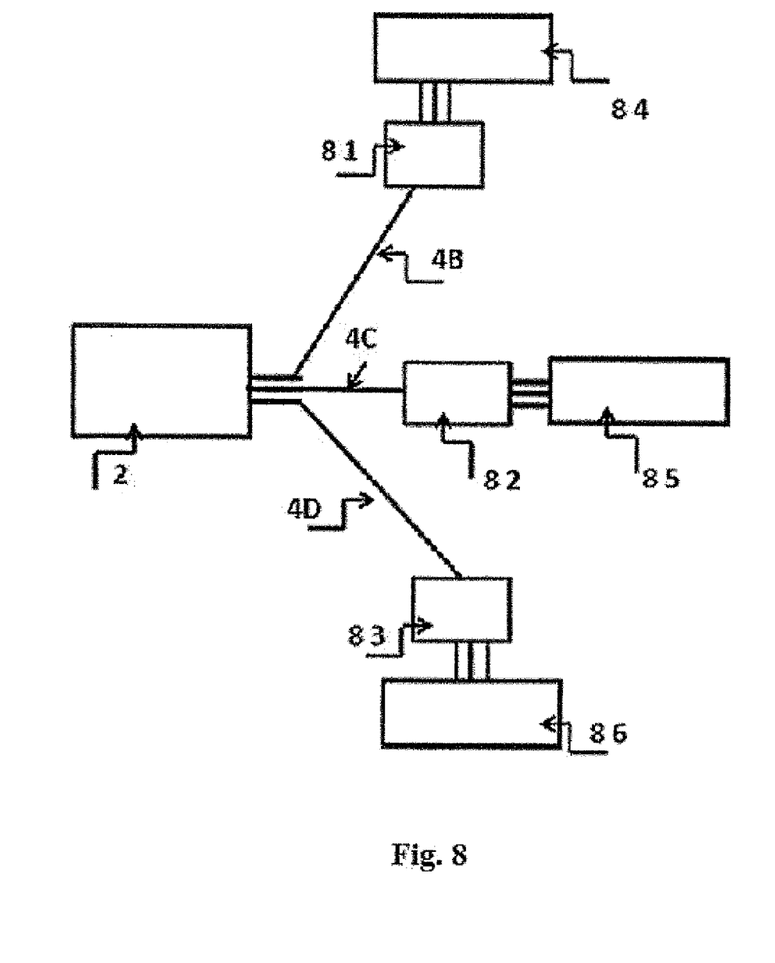
FIG. 8 is a view schematically showing a system for transmission and distribution of electrical energy generated by a three-phase electric current power source according to a still further embodiment of the present invention.

FIG. 8 shows a further embodiment of the electrical energy transmission system according to the present invention. In this embodiment the three-phase electric current signal generated by the three-phase electric current source 2 is converted by a converting device 11''' so that here three components from three-phase electric currents are separately and individually supplied through single-wire transmission lines 4B, 4C, 4D further directly to subsequent consumers 81, 82 and 83, and then converted into three-phase currents and transmitted further through additional transmission lines to further consumers 84, 85, 86.

Figure 9:
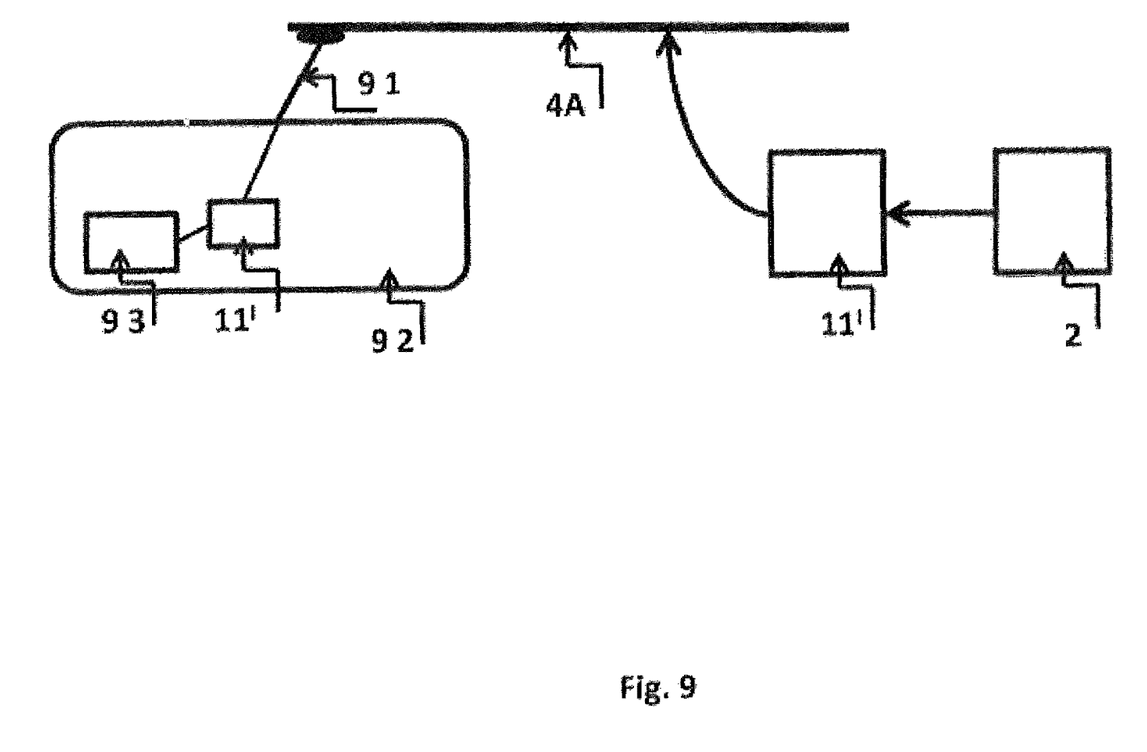
FIG. 9 is a view schematically showing a system for supplying electric current to an electric train with the use of the electrical energy transmission system according to the present invention.

FIG. 9 illustrates one of many applications of the electrical energy transmission system according to the present invention, in particular for an electric vehicle, for example electric train. The three-phase electrical current power source 2 generates a three-phase electric current signal which is converted by the converting device 11' so that its three currents have the same phases, and is then transmitted through the single-wire transmission line 4A. A pantograph 91 of an electric train 92 transmits the electric current signal from the single-wire transmission line 4A to the converting device 11" which converts the transmitted electric current signal into a three-phase electric current signal with its currents having the phases which are offset from each other by 120 degrees. This three-phase electric current signal is supplied to an electric motor 93 of the electric train 92.

It is also possible to use for electrical energy supply of an electric vehicle instead of the convertors 11' and 11", a convertor which processes a single-phase signal transmitted through a single-wire line and then a convertor which processes the received signal into a one-phase signal supplied to the electric motor of the electric train.

Figure 10:
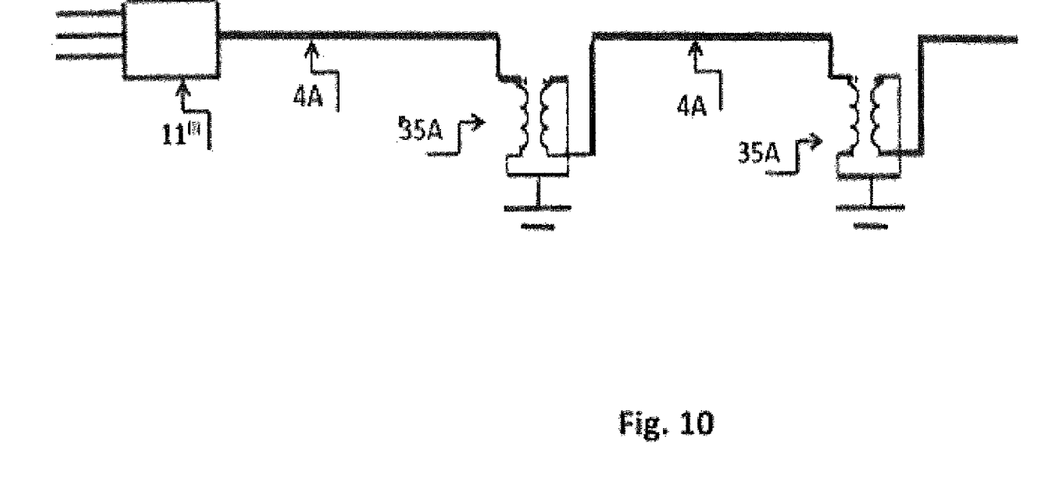
FIG. 10 is a view schematically showing a further embodiment of an electrical transmission line of the electrical energy transmission system according to the present invention.

FIG. 10 shows a further embodiment of the electrical energy transmission system according to the present invention, in which the single-wire transmission line 4A is subdivided into a plurality of line portions, which for example can have a length of 20-100 km. The line portions are connected with each other via invertors 35A which can be formed as transformers with the winding which are connected toward each other and zeroing of an intermediate point. They can be similar to the inventors in the converting devices 11 and 11". It is known that electrical energy transmission lines during current transmission emit energy which causes additional energy losses. In the electrical energy transmission system shown in FIG. 10 the converting devices 35A change phases of the current by 180 degrees, so that the currents of each two neighboring line portions 4A have opposite phases. As a result a sum of the emissions will be equal to zero, and the whole electrical energy transmission line will not emit energy, thus reducing the energy losses.

The present invention is not limited to the details shown since various modifications and structural changes are possible without departing from the spirit of the invention.

What is desired to be protected by Letters Patent is set forth in particular in the appended claims.

The invention claimed is:

1. An electrical energy transmission system, comprising a three-phase electric current power source generating a three-phase electric current signal including three electric currents having different phases; a converting device connected with said three-phase electric current power source and converting the three-phase electric current signal generated by said three-phase electric current power source into a converted three-phase electric current signal; and a single-wire electrical energy transmission line connected with said converting device and transmitting further at least a part of the converted three-phase electric current signal, wherein said converting device is constructed to shift the phases of at least some of the three electric currents so that the three electric currents have substantially identical phases in the converted common electric current signal, which is then transmitted through said single-wire transmission line.

2. The electrical energy transmission system of claim 1, further comprising a step-up transformer located before the converting device and increasing a voltage of the electrical current signal and, in the event of fluctuations of an electrical resistance of a load, generating a control signal for changing its transformation ratio to maintain out voltage constant, wherein said converting device is connected by a feed-back line with said step-up transformer and receives said control signal and thereby carries out the conversion of the electrical signal in the same manner regardless of the fluctuations of the electrical resistance of the load.

3. The electrical energy transmission system of claim 2, wherein said converting device, in response to said control signal, changes its reactive electrical resistance to maintain constant a ratio of the reactive electrical resistance to the electrical resistance of the load.

4. The electrical energy transmission system of claim 1, further comprising a further converting device connected with an opposite end of said one-wire electrical energy transmission line and converting the converted common electric current signal transmitted through said single-wire transmission line by shifting back the phases of the three electric currents into the three-phase electric current signal to be supplied to a load.

5. The electrical energy transmission system of claim 4, further comprising a step-down transformer located after said further converting device and reducing a voltage of the electrical current signal and, in the event of fluctuations of an electrical resistance of a load, generating a control signal for changing its transformation ratio to maintain out voltage constant, wherein said converting device is connected by a feed-back line with said step-down transformer and receives said control signal and thereby carries out the conversion of the electrical signal in the same manner regardless of the fluctuations of the electrical resistance of the load.

6. The electrical energy transmission system of claim 5, wherein said converting device in response to said control signal, changes its reactive electrical resistance to maintain constant a ratio of the reactive electrical resistance to the electrical resistance of the load.

7. The electrical energy transmission system of claim 4, further comprising an electric vehicle provided with an electric motor which is connected to said further converting device to receive the three-phase electric current signal from said further converting device through a further single-wire transmission line.

8. The electrical energy transmission system of claim 1, further comprising additional transmission lines connected with said single-wire electrical energy transmission line and transmitting the converted common electric current signal to consumers.

9. The electrical energy transmission system of claim 1, further comprising an additional converting device which separates the electric currents of the converted common three-phase electric current signal and provide their further transmission separately through separate single-wire transmission lines to consumers.

10. The electrical transmission system of claim 1, further comprising a converting device which provides a transmission of said converted common three-phase electric current signal through separate single-wire transmission lines to further customers.

11. The electrical energy transmission system of claim 1, wherein said single-wire electrical energy transmission line is subdivided into a plurality of line portions, further comprising a plurality of converting devices which convert a phase of the currents in the line portions substantially by 180 degrees so that the phases of the currents in the neighboring ones of the line portions are opposite.

12. The electrical energy transmission system of claim 11, wherein the converting devices are constructed to convert the phase of the electric current in the neighboring ones of the line portions so that a sum of energy emissions of the neighboring ones of the line portions substantially equal near zero.

* * * * *